US011148786B2

(12) United States Patent
Heard et al.

(10) Patent No.: US 11,148,786 B2
(45) Date of Patent: Oct. 19, 2021

(54) SYSTEM AND METHOD FOR ADJUSTABLE BALLAST

(71) Applicant: Bell Textron Inc., Fort Worth, TX (US)

(72) Inventors: Derek William Heard, Fort Worth, TX (US); Richard Theodore Perryman, Fort Worth, TX (US); Nathan Craig Clark, Arlington, TX (US); Joshua Andrew Emrich, Grapevine, TX (US); Yann Lavallee, St-Hippolyte (CA); Ralph Michael Gannarelli, Keller, TX (US)

(73) Assignee: Bell Textron Inc., Fort Worth, TX (US)

( * ) Notice: Subject to any disclaimer, the term of this patent is extended or adjusted under 35 U.S.C. 154(b) by 33 days.

(21) Appl. No.: 16/899,295

(22) Filed: Jun. 11, 2020

(65) Prior Publication Data

US 2021/0061448 A1 Mar. 4, 2021

Related U.S. Application Data

(63) Continuation-in-part of application No. 16/555,515, filed on Aug. 29, 2019, now Pat. No. 11,001,373.

(51) Int. Cl.
*B64C 17/00* (2006.01)
*B64C 17/08* (2006.01)

(52) U.S. Cl.
CPC .................... *B64C 17/08* (2013.01)

(58) Field of Classification Search
CPC .................... B64C 17/00; B64C 17/08
See application file for complete search history.

(56) References Cited

U.S. PATENT DOCUMENTS 9,415,870 B1 * 8/2016 Beckman .............. B64C 39/024
9,908,619 B1 * 3/2018 Beckman ................ B64C 17/02

FOREIGN PATENT DOCUMENTS

KR 1020120076208 A 7/2012

OTHER PUBLICATIONS

Heard, Derek William, et al.; "System and Method for Adjustable Ballast"; U.S. Appl. No. 16/555,655, filed Aug. 29, 2019.
Cabka GmbH & Co.;" Ballast plate"; XP055688023; https://cabka.com/global/en/m/products/produktuebersicht/produktdetails/pk/Produkt/details/965/; Feb. 6, 2017 [retrieved on Apr. 21, 2020]; 1 page.

(Continued)

*Primary Examiner* — Richard G Davis
(74) *Attorney, Agent, or Firm* — Shackelford, Bowen, McKinley & Norton, LLP

(57) ABSTRACT

A movable ballast system for an aircraft includes first and second ballast docks secured to the aircraft. The first ballast dock includes a first housing and a first ballast tray and a first stop plate secured within the first housing. The first ballast tray includes a plurality of channels. The second ballast dock is positioned aft of a CG of the aircraft and includes a second housing and a second ballast tray and a second stop plate secured within the second housing. The second ballast tray includes a plurality of channels. The movable ballast system includes a plurality of movable ballasts, each movable ballast of the plurality of movable ballasts being configured to fit within at least one channel of each of the plurality of channels of the first and second ballast trays.

20 Claims, 9 Drawing Sheets

(56) References Cited

OTHER PUBLICATIONS

U.S. Department of Transportation, Federal Aviation Administration; "Aircraft Weight and Balance Handbook—FAA-H-8083-1A"; XP055687905; https://skybrary.aero/bookshelf/books/879.pdf; Jul. 29, 2014 [retrieved on Apr. 21, 2020]; 97 pages.

* cited by examiner

SYSTEM AND METHOD FOR ADJUSTABLE BALLAST

CROSS-REFERENCES TO RELATED APPLICATIONS

This application is a continuation-in-part of U.S. patent application Ser. No. 16/555,515 that was filed on Aug. 29, 2019. U.S. patent application Ser. No. 16/555,515 is incorporated herein by reference.

BACKGROUND

This section provides background information to facilitate a better understanding of the various aspects of the disclosure. It should be understood that the statements in this section of this document are to be read in this light, and not as admissions of prior art.

Aircraft often require the use of ballast to ensure that the center of gravity (CG) of the aircraft is within a CG envelope for that particular aircraft. The CG envelope is a bounded area or volume within which the CG of the aircraft should be positioned in order to maintain desirable flight characteristics. When loading up the aircraft with passengers, cargo, and the like, the CG of the aircraft changes. In some situations, the CG can change so much that the CG moves outside of the aircraft's CG envelope and the aircraft's flight characteristics are negatively affected. In order to maintain desirable flight characteristics, it is important that the CG stay within the desired CG envelope.

Modern aircraft often have flight control computers that monitor various aspects of the aircraft. Some flight control computers have the ability to calculate the CG based upon information input by a pilot. This information can include aircraft configuration information (e.g., number and location of seats installed), passenger information (e.g., passenger weight and location), cargo information (e.g., weight and location), and the like. Upon inputting this data, the flight control computer determines the approximate CG of the aircraft. If necessary, the pilot can adjust the CG by making adjustments to one or more of the passenger position, cargo position, and the like to adjust the center of gravity. However, in some instances such adjustments are not desirable or practical.

Some aircraft include fixed ballasts to manipulate the CG of the aircraft. Fixed ballasts can technically be removed or added, but doing so often requires a certified mechanic due to the amount and type of work required. Furthermore, removal/addition of fixed ballasts is often impractical or impossible. As a workaround, some pilots add temporary ballast to the aircraft, such as sandbags or water jugs, to alter the CG. Adding temporary ballast to the aircraft can be problematic. For example, the aircraft may fly from a first location to a second location to drop off cargo or passengers. For the return flight from the second location to the first location, the CG of the aircraft may have changed significantly. To address the CG change, the pilot needs to add ballast to the aircraft. The problem with using temporary ballast is that the pilot may not have access to temporary ballast at the second location. The inverse is also true. For example, if the aircraft flies from the first location to the second location to pick up cargo or passengers, the aircraft may require temporary ballast on the way to pick up the cargo or passengers. When returning from the second location to the first location, the temporary ballast may no longer be needed. The pilot must then leave the ballast behind or use up some of the aircraft's cargo capacity (both weight and volume) with the temporary ballast.

SUMMARY

An example of a movable ballast system for an aircraft includes a ballast dock with a housing. The housing includes a first ballast tray secured within the housing and comprising a plurality of channels, a first stop plate secured within the housing, and a plurality of movable ballasts, each movable ballast of the plurality of movable ballasts being configured to fit within at least one channel of the plurality of channels.

An example of a movable ballast system for an aircraft includes: a first ballast dock secured to the aircraft and comprising a first housing and a first ballast tray and a first stop plate secured within the first housing, the first ballast tray comprising a plurality of channels; a second ballast dock secured to the aircraft and positioned aft of a CG of the aircraft, the second ballast dock comprising a second housing and a second ballast tray and a second stop plate secured within the second housing, the second ballast tray comprising a plurality of channels; and a plurality of movable ballasts, each movable ballast of the plurality of movable ballasts being configured to fit within at least one channel of each of the plurality of channels of the first and second ballast trays.

This summary is provided to introduce a selection of concepts that are further described below in the detailed description. This summary is not intended to identify key or essential features of the claimed subject matter, nor is it intended to be used as an aid in limiting the scope of claimed subject matter.

BRIEF DESCRIPTION OF THE DRAWINGS

The disclosure is best understood from the following detailed description when read with the accompanying figures. It is emphasized that, in accordance with standard practice in the industry, various features are not drawn to scale. In fact, the dimensions of various features may be arbitrarily increased or reduced for clarity of discussion.

DETAILED DESCRIPTION

Figure 1:
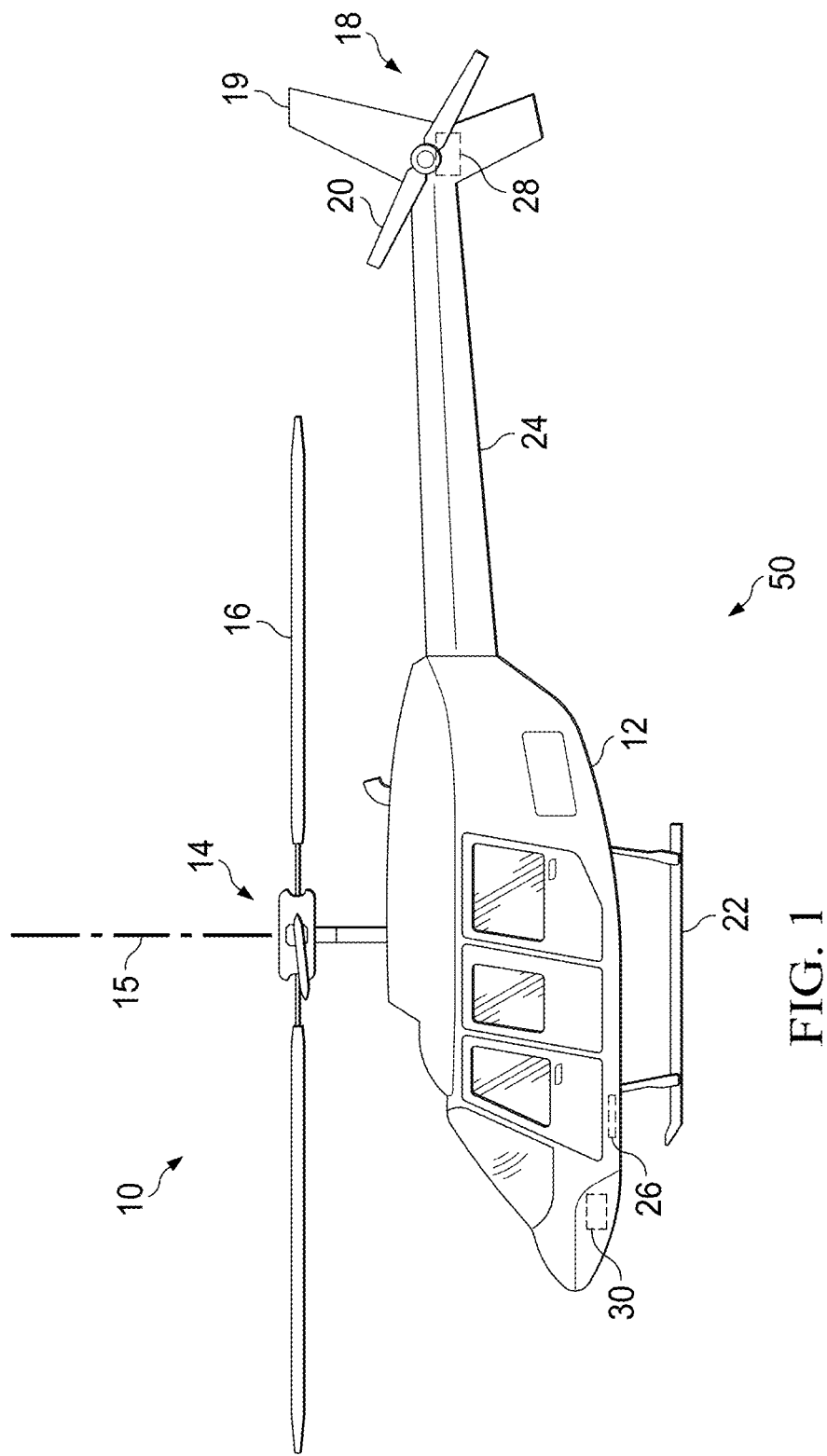
FIG. 1 illustrates a rotorcraft in accordance with aspects of the disclosure.

It is to be understood that the following disclosure provides many different embodiments, or examples, for implementing different features of various embodiments. Specific examples of components and arrangements are described below to simplify the disclosure. These are, of course, merely examples and are not intended to be limiting. In addition, the disclosure may repeat reference numerals and/or letters in the various examples. This repetition is for the purpose of simplicity and clarity and does not in itself dictate a relationship between the various embodiments and/or configurations discussed.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

FIG. 1 illustrates an example of a rotorcraft 10. Rotorcraft 10 includes a fuselage 12, a main rotor system 14 with rotor blades 16, and a tail rotor system 18 with tail rotor blades 20. An engine within fuselage 12 supplies main rotor system 14 and tail rotor system 18 with torque to rotate rotor blades 16 and tail rotor blades 20. As illustrated in FIG. 1, rotorcraft 10 includes four rotor blades 16. In other aspects, rotorcraft 10 could include as few as two or three rotor blades 16 or more than four rotor blades 16 (e.g., five, six, etc.). Landing gear 22 extend from fuselage 12 and support rotorcraft 10 when rotorcraft 10 is landing or when rotorcraft 10 is at rest on the ground. Rotorcraft 10 includes a flight control computer 30 configured monitor and control aspects of rotorcraft 10. Rotorcraft 10 is not meant to be limiting. Aspects of the disclosure apply to other rotorcraft as well.

Rotorcraft 10 includes a movable ballast system 50 that includes a fore ballast dock 26 and an aft ballast dock 28. The terms fore and aft are used to indicated that fore ballast dock 26 is located forward of aft ballast dock 28 and aft ballast dock 28 is located rearward of fore ballast dock 26. Movable ballast system 50 allows the CG of rotorcraft 10 to be adjusted by selectively placing ballasts into fore ballast dock 26 and aft ballast dock 28. For example, the CG of rotorcraft 10 can be moved forward by placing ballasts into fore ballast dock 26 and the CG of rotorcraft 10 can be moved rearward by placing ballasts into aft ballast dock 28.

Fore ballast dock 26 is typically located fore of an axis 15 of the mast of main rotor system 14. In some aspects fore ballast dock 26 is located fore of the CG of rotorcraft 10. In some aspects, fore ballast dock 26 may be located under a pilot or co-pilot seat. Placing fore ballast dock 26 under the pilot or co-pilot seats provides easy access to fore ballast dock 26. In other aspects, fore ballast dock 26 may be located in another location within fuselage 12 (e.g., in or near a foot well of the pilot or co-pilot, secured to a seatback of the pilot or co-pilot, on the ceiling, and the like). In other aspects, fore ballast dock 26 may be located on an underside of fuselage 12.

Aft ballast dock 28 is typically located aft of axis 15 of the mast of main rotor system 14. In a typical aspect, aft ballast dock 28 is located aft of the CG of rotorcraft 10. In some aspects, aft ballast dock 28 is located aft of the CG of rotorcraft 10 (e.g., proximal to tail rotor system 18) and fore ballast dock 26 is located proximal to the CG of the aircraft (e.g., fore ballast dock 26 may be located close to but fore or aft of the CG of the aircraft). In various aspects, aft ballast dock 28 is secured to tail fin 19 or tail boom 24 of rotorcraft 10. As illustrated in FIG. 1, aft ballast dock 28 is located proximal to tail rotor system 18. In other aspects, aft ballast dock 28 may be located at a position anywhere along tail boom 24 or in or on fuselage 12 that is rearward of axis 15. Positioning aft ballast dock 28 farther rearward provides more leverage for the ballast in aft ballast dock 28, which increases the ballast effect of aft ballast dock 28.

Movable ballast system 50 is shown illustrated with rotorcraft 10. Those of skill in the art will recognize that movable ballast system 50 could be implemented on other aircraft including tiltrotors and airplanes. For example, when used with an airplane, fore ballast dock 26 may be located fore of a CG of the aircraft and aft ballast dock 28 may be located aft of the CG of the aircraft (e.g., proximal to the tail of the aircraft).

Figure 2:
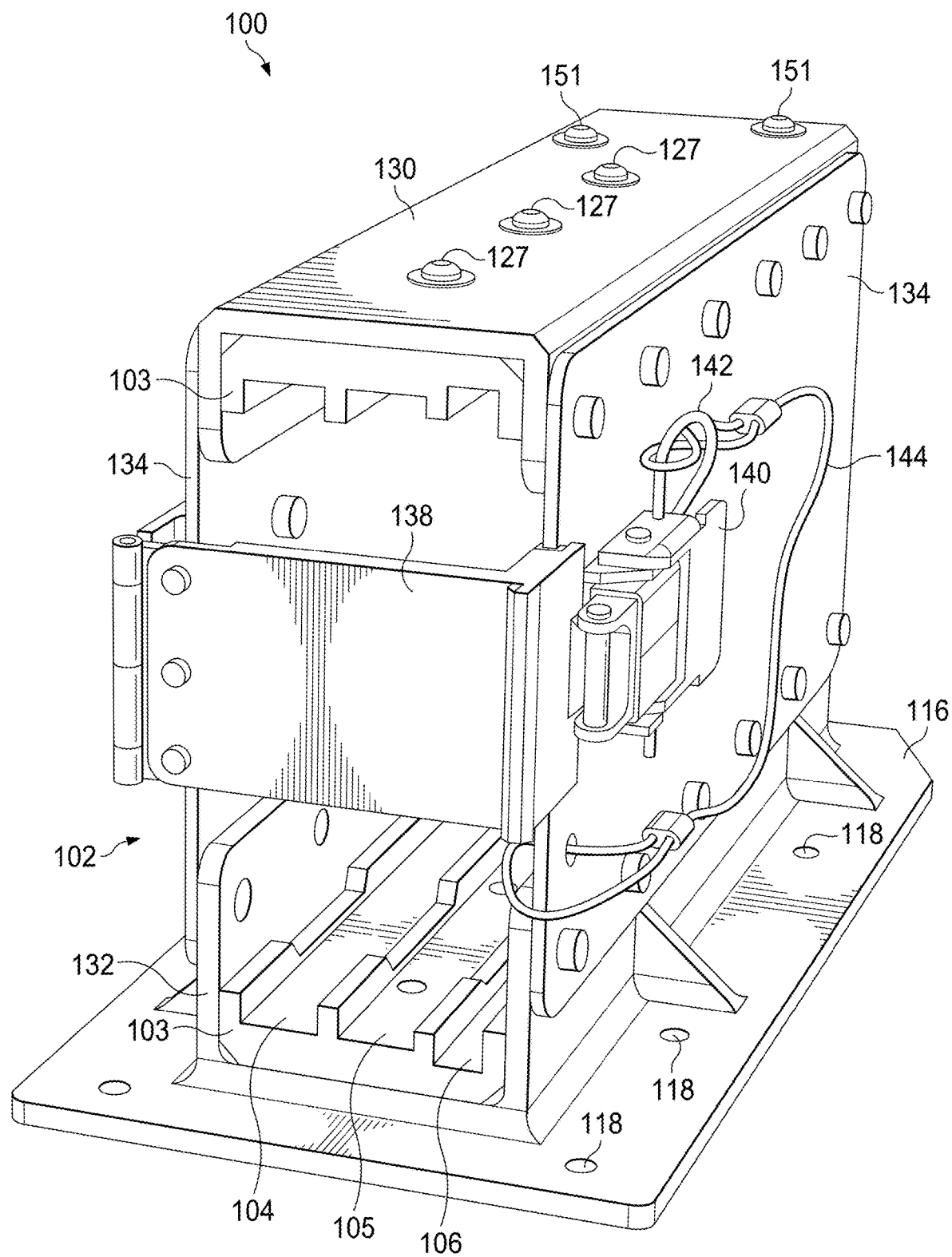
FIG. 2 illustrates a ballast dock in accordance with aspects of the disclosure.
Figure 3:
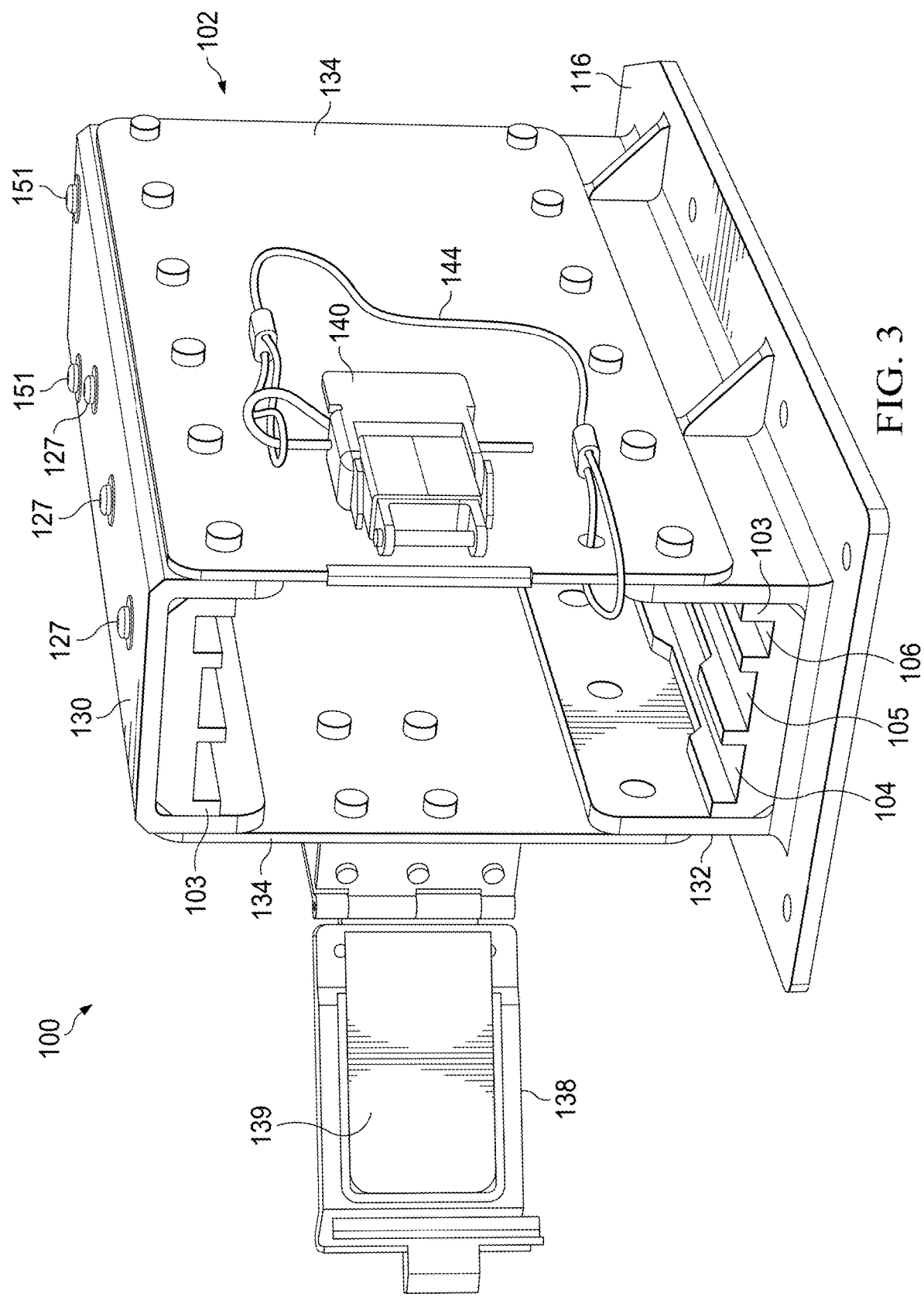
FIG. 3 illustrates the ballast dock of FIG. 2 in accordance with aspects of the disclosure.

FIGS. 2 and 3 are perspective views illustrating a ballast dock 100 according to aspects of the disclosure. Ballast dock 100 may be used as either or both of fore ballast dock 26 and aft ballast dock 28 of FIG. 1. Ballast dock 100 includes a housing 102 that is configured to receive movable ballasts (e.g., see movable ballasts 207-209 illustrated in FIGS. 5-7). Each movable ballast is a weight that is placed within rotorcraft 10 to alter the CG of rotorcraft 10. Housing 102 includes an upper plate 130, a lower plate 132, and a pair of side plates 134. The pair of side plates 134 join upper plate 130 and lower plate 132 together to define a cavity within housing 102 that receives movable ballasts. Housing 102 includes a pair of ballast trays 103, with one ballast tray 103 secured to upper plate 130 and one ballast tray 103 secured to lower plate 132. A pair of stop plates 136 (best seen in FIG. 4) are also secured to housing 102 adjacent to plates 130, 132, respectively. The pair of ballast trays 103 and the pair of stop plates 136 are discussed in more detail below.

In the aspect illustrated in FIG. 2, lower plate 132 is integrally formed with a mounting plate 116. In other aspects, lower plate 132 is a separate piece that is coupled to mounting plate 116. Mounting plate 116 facilitates mounting ballast dock 100 to rotorcraft 10. As illustrated in FIG. 2, mounting plate 116 includes bores to accommodate fasteners 118 that are used to secure ballast dock 100 to, for example, a wall or floor within fuselage 12 or another part of the airframe of rotorcraft 10. Fasteners 118 may be screws, bolts, pins, and the like. In some aspects, ballast dock 100 is secured to a portion of the cabin floor in proximity to a pilot's seat to allow the pilot to visibly inspect ballast dock 100 from the pilot's seat. Mounting plate 116 is positioned on along a short side of housing 102 so that ballast dock 100 takes up less mounting surface area. In some aspects, mounting plate 116 is a separate piece that attaches to lower plate 132.

Housing 102 includes a door 138 that is used to secure the movable ballasts within housing 102. Door 138 may be secured closed via a latch 140. Latch 140 may be, for example, an over-center latch or other type of latching mechanism or clasp. In some aspects, latch 140 includes a lock pin 142 that, when in place, prevents latch 140 from opening. Lock pin 142 may be secured to housing 102 via a wire 144 so that lock pin 142 is not misplaced. Ensuring that door 138 does not inadvertently open reduces the risk of a movable ballast falling out of housing 102. If a movable ballast were to come out, especially when ballast dock 100 is installed in the aft position, the movable ballast could cause a tail rotor strike or other damage to the aircraft. In some aspects, door 138 includes a pad 139 that is secured to an inside face of door 138. Pad 139 is made of a compressible material (e.g., elastomers, rubbers, foams, plastics, or the like) that deforms around edges of the movable ballasts. Pad 139 applies a force against the edges of the movable ballasts to firmly hold the movable ballasts in place between door 138 and stop plates 136 to prevent the movable ballasts from rattling/vibrating.

Figure 4:
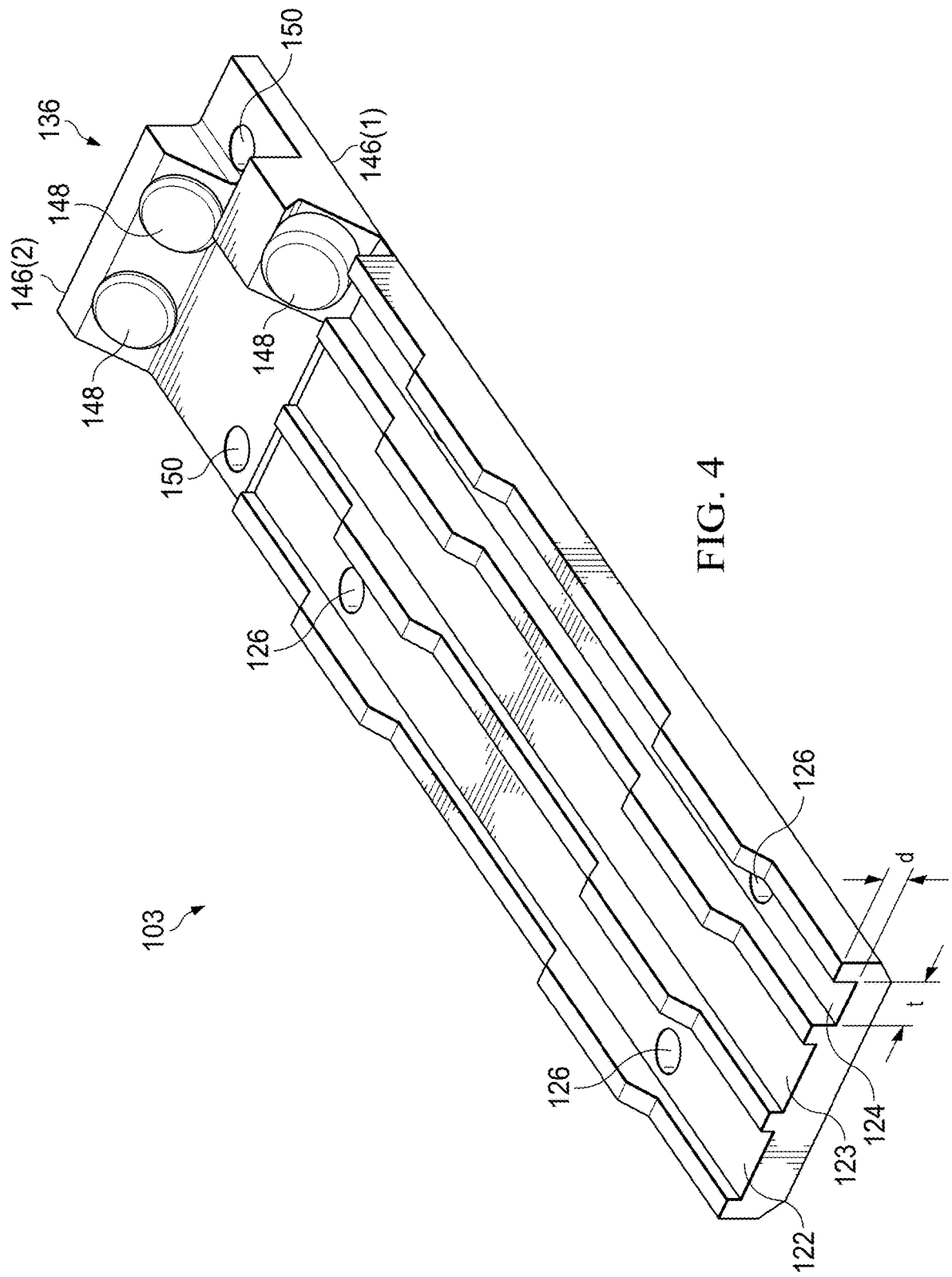
FIG. 4 illustrates a ballast tray assembly in accordance with aspects of the disclosure.

FIG. 4 illustrates one ballast tray 103 and one stop plate 136 according to aspects of the disclosure. Ballast dock 100 includes two ballast trays 103 and two stop plates 136, with a pair of each secured to upper plate 130 and a pair of each secured to lower plate 132 (e.g., similar to FIG. 7). The pair of ballast trays 103 and the pair of stop plates 136 are mirrors of each other, respectively. Only one ballast tray 103 and one stop plate 136 will be discussed with the understanding that the discussion applies to both ballast trays 103 and both stop plates 136. Ballast tray 103 includes channels 122-124. Opposing channels 122-124 of the pair of ballast trays 103 form bays 104-106. For example, each channel 122-124 is dimensioned with a thickness t and a depth d to accommodate dimensions of a movable ballast. Ballast tray 103 includes one or more bores 126 that receive fasteners 127 (e.g., screws, bolts, pins, and the like) to secure ballast tray 103 to housing 102. In other aspects, ballast tray 103 may be secured to housing 102 via adhesives, welding, rivets, and the like.

Stop plate 136 is positioned next to ballast tray 103 within housing 102 at an end of housing 102 opposite door 138. Stop plate 136 includes one or more stops 146 against which ends of movable ballasts abut when the movable ballasts are placed within ballast dock 100. As illustrated in FIG. 4, stop plate 136 includes stop 146(1) and stop 146(2). Each stop 146(1), (2) extends upward from stop plate 136. Stops 146(1), (2) are physical barriers that prevent the movable ballasts from being able to pass completely through housing 102. In the aspect of FIG. 4, stop 146(1) is located closer to ballast tray 103 than stop 146(2) to accommodate a shorter movable ballast. In other aspects, each stop 146 may be positioned relative to ballast tray 103 as desired to accommodate various ballast tray 103 lengths. Stops 146(1), (2) include pads 148 that dampen vibrations between the movable ballasts and stops 146(1), (2).

With door 138 in the closed position, any movable ballasts inserted into ballast dock 100 are firmly held in place between pad 139 and pads 148. Similar to pad 139, pads 148 may be made of a variety of materials, including elastomers, rubbers, foams, plastics, etc. In some aspects, the movable ballasts themselves may include pads or equivalent that are secured to their ends and pads 148 may not be necessary. Pads 148 are replaceable to provide different thicknesses or to account for worn pads 148. Stop plate 136 includes bores 150 that receive fasteners 151 to secure stop plate 136 to upper plate 130/lower plate 132.

In the aspect of FIG. 4, ballast tray 103 and stop plate 136 are separate parts. In other aspects, ballast tray 103 and stop plate 136 may be a single, unitary piece that forms a ballast tray assembly. Forming ballast tray 103 and stop plate 136 as a single piece allows a user to quickly swap out ballast tray assemblies to accommodate different movable ballasts. For example, to accommodate more weight in ballast dock 100, a first set of ballast tray assemblies may be installed in ballast dock 100. More weight may be accommodated by, for example, increasing the size of bays 104-106 to allow larger movable ballasts to be inserted into housing 102. To accommodate less weight in ballast dock 100, a second set of ballast tray assemblies may be installed in ballast dock 100. Less weight may be accommodated by, for example, decreasing the size of bays 104-106 to limit the size of movable ballasts that may be inserted into housing 102.

In some aspects, ballast tray 103 is made from or coated with a non-metallic material to reduce the likelihood of the movable ballasts rattling within housing 102. For example, ballast tray 103 may be made from elastomers, rubbers, plastics, polymers and the like. In some aspects, coatings can be applied to a surface of ballast tray 103. Coating materials include elastomers, rubbers, plastics, polymers, fabrics, textiles, and the like. In some aspects, the movable ballasts may be coated with a material to reduce the likelihood of the movable ballasts rattling within housing 102. Coating materials include elastomers, rubbers, plastics, polymers, fabrics, textiles, and the like.

In some aspects, ballast dock 100 includes a single ballast tray 103 with a single stop plate 136. In aspects with only a single ballast tray 103 and stop plate 136, channels 122-124 are dimensioned so that opposite edges of the movable ballasts abut an opposite side of housing 102 (e.g., upper plate 130) so that the movable ballasts are retained securely within housing 102 to prevent the movable ballasts from rattling inside housing 102.

Figure 5:
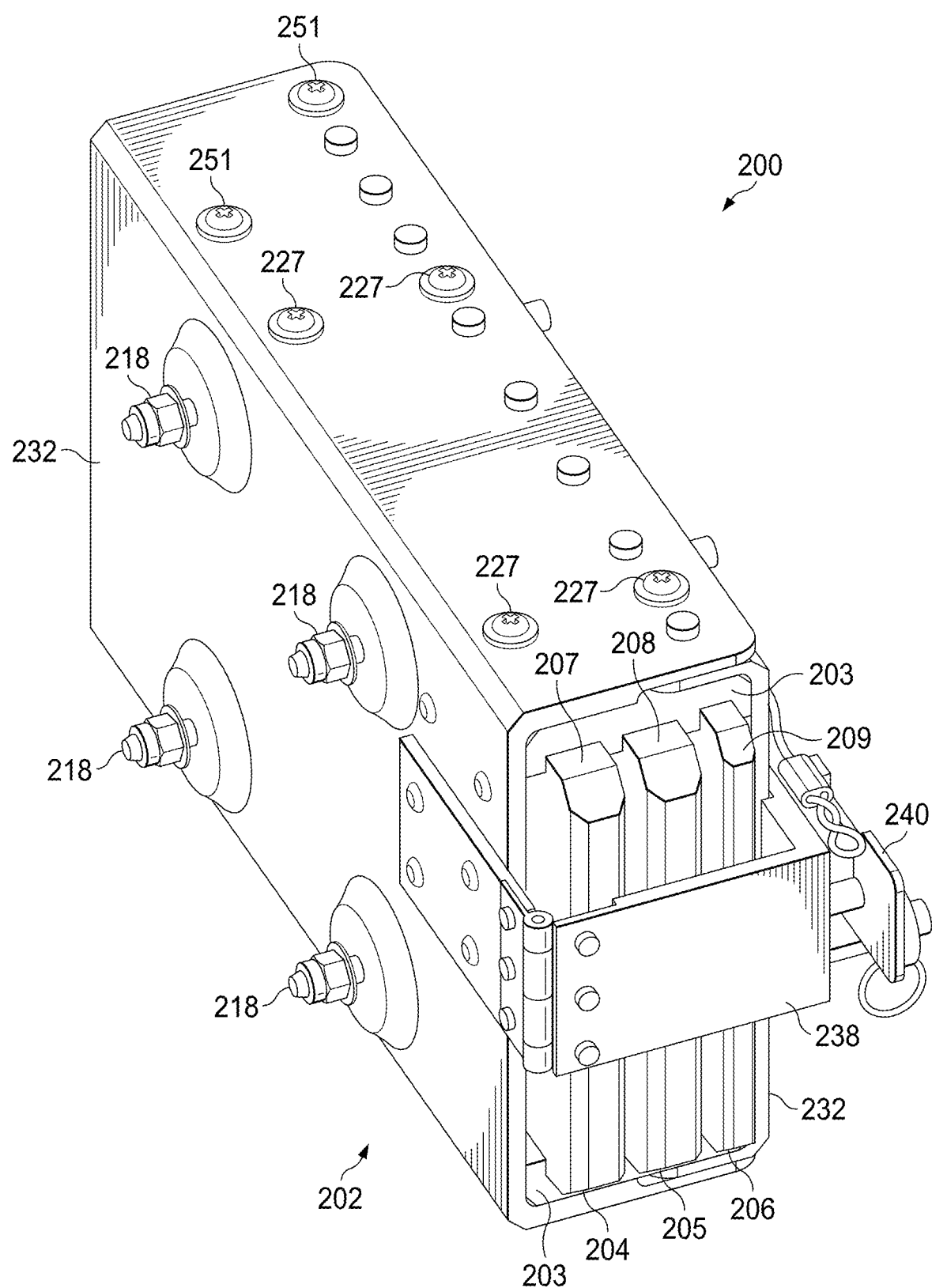
FIG. 5 illustrates a ballast dock in accordance with aspects of the disclosure.
Figure 6:
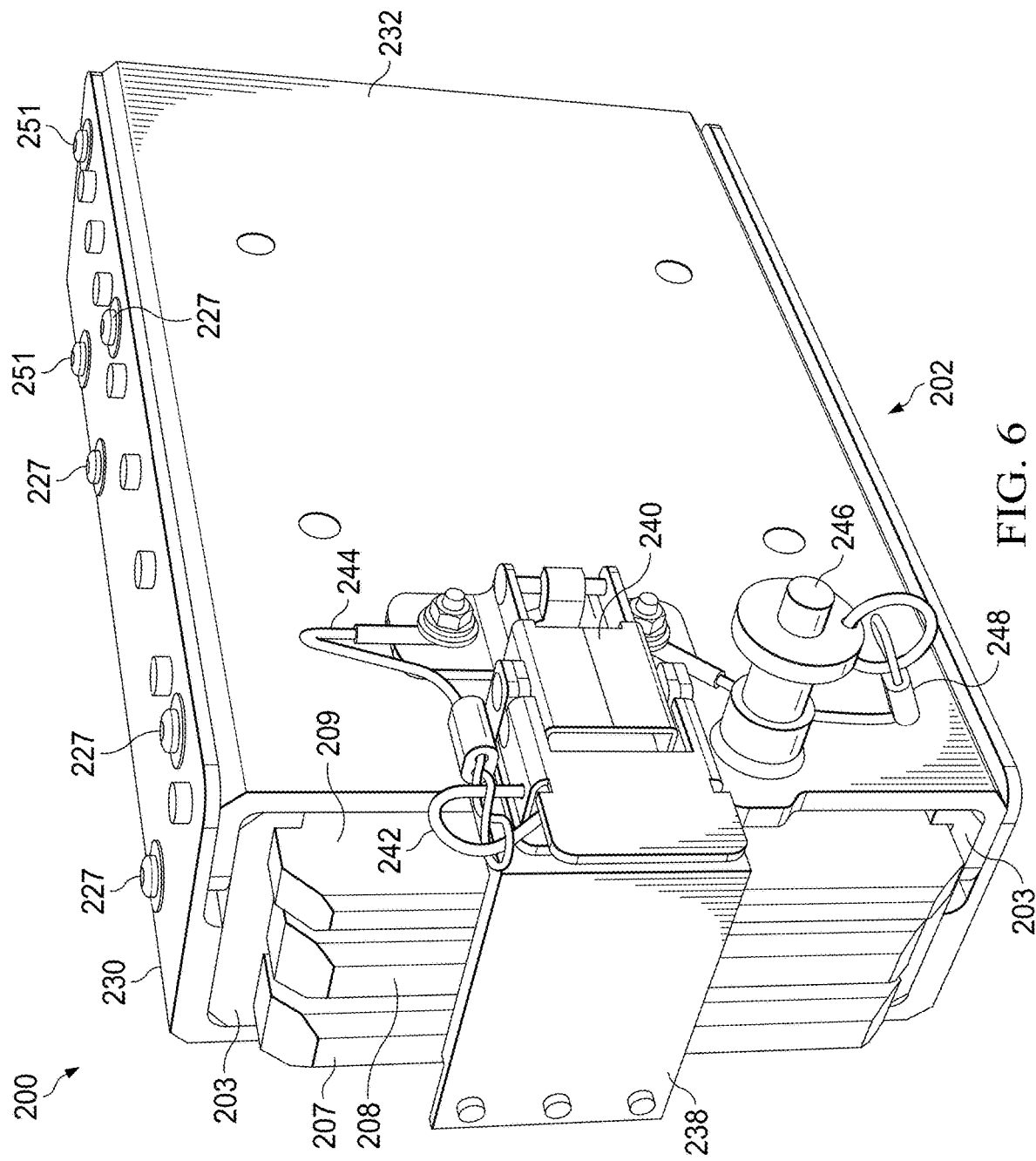
FIG. 6 illustrates the ballast dock of FIG. 5 in accordance with aspects of the disclosure.

FIGS. 5 and 6 illustrate a ballast dock 200 according to aspects of the disclosure. Ballast dock 200 is illustrated with movable ballasts 207-209 installed inside a housing 202. Ballast dock 200 is similar to ballast dock 100 discussed above. Movable ballasts 207-209 may be used with either of ballast docks 100 and 200. Similar part numbers are used in FIGS. 5-7 for parts that are similar to those described in FIGS. 2-4. Ballast dock 200 may be used as either or both of fore/aft ballast docks 26, 28. Housing 202 includes ballast trays 203 that form bays 204-206. Ballast trays 203 are secured to housing 202 via fasteners 227. In other aspects, ballast tray 203 may be secured to housing 102 via adhesives, welding, rivets, and the like. Although not visible in FIGS. 5 and 6, ballast dock 200 includes stop plates similar to stop plates 136 discussed above relative ballast dock 100. Bays 204-206 are configured to receive movable ballasts 207-209. In the aspect of FIG. 5, movable ballasts 207 and 208 have the same dimensions and weights and movable ballast 209 has different dimensions and weight relative movable ballasts 207 and 208, as indicated by their different thicknesses and widths. In other aspects, movable ballasts 207-209 can have the same weights and dimensions. In other aspects, the weights of movable ballasts 207-209 may each have unique weights.

In contrast to ballast dock 100, ballast dock 200 does not include mounting plate 116. Instead, housing 202 attaches to rotorcraft 10 via fasteners 218 that pass through a side of housing 202. Relative to ballast dock 100, ballast dock 200 offers a different mounting configuration to allow for different mounting scenarios. For example, it may be preferable to use ballast dock 100 as fore ballast dock 26 and to use ballast dock 200 as aft ballast dock 28. Other aspects may use either ballast dock 100, 200 as fore ballast dock 26 and/or either ballast dock 100, 200 as aft ballast dock 28.

Housing 202 is formed from a first plate 230 and a second plate 232. Each plate 230, 232 has a c-channel shape. As illustrated in FIGS. 5 and 6, second plate 232 is dimensioned to fit within the c-channel of 230 to define housing 202. In other aspects, the relative dimensions may be changed. The c-channel design of first and second plates 230, 232 makes it easy to change the size of housing 202 by supplying plates 230, 232 with different dimensions. Changing the size of housing 202 allows for smaller or larger (i.e., heavier or lighter) ballasts to be stored within ballast dock 200.

Housing 202 includes a door 238 that is used to secure movable ballasts 207-209 within housing 202. Door 238 may be secured closed via a latch 240. Latch 240 may be, for example, an over-center latch or other type of latching mechanism. In some aspects, latch 240 includes a lock pin 242 that, when in place, prevents latch 240 from opening. Lock pin 242 may be secured to housing 202 via a wire 244 so that lock pin 242 is not misplaced while removed from latch 240. Ensuring that door 238 does not inadvertently open reduces the risk of one or more of movable ballasts 207-209 falling out of housing 202. If a movable ballast were to come out, especially when ballast dock 200 is installed in the aft position, the movable ballast could cause a tail rotor strike or cause other damage to the aircraft. As an added measure of security, ballast dock 200 may include a lock pin 246. Lock pin 246 further secures door 238. To lock door 238 in place, lock pin 246 extends into a bore formed through a side of second plate 232. When lock pin 246 is inserted into the bore of second plate 232, door 238 cannot open. To allow door 238 to open, lock pin 246 is pulled out away from housing 202 to disengage lock pin 246 from the bore of second plate 232. Lock pin 246 may be secured to housing 202 via a wire 248 so that lock pin 246 is not misplaced while removed.

Figure 7:
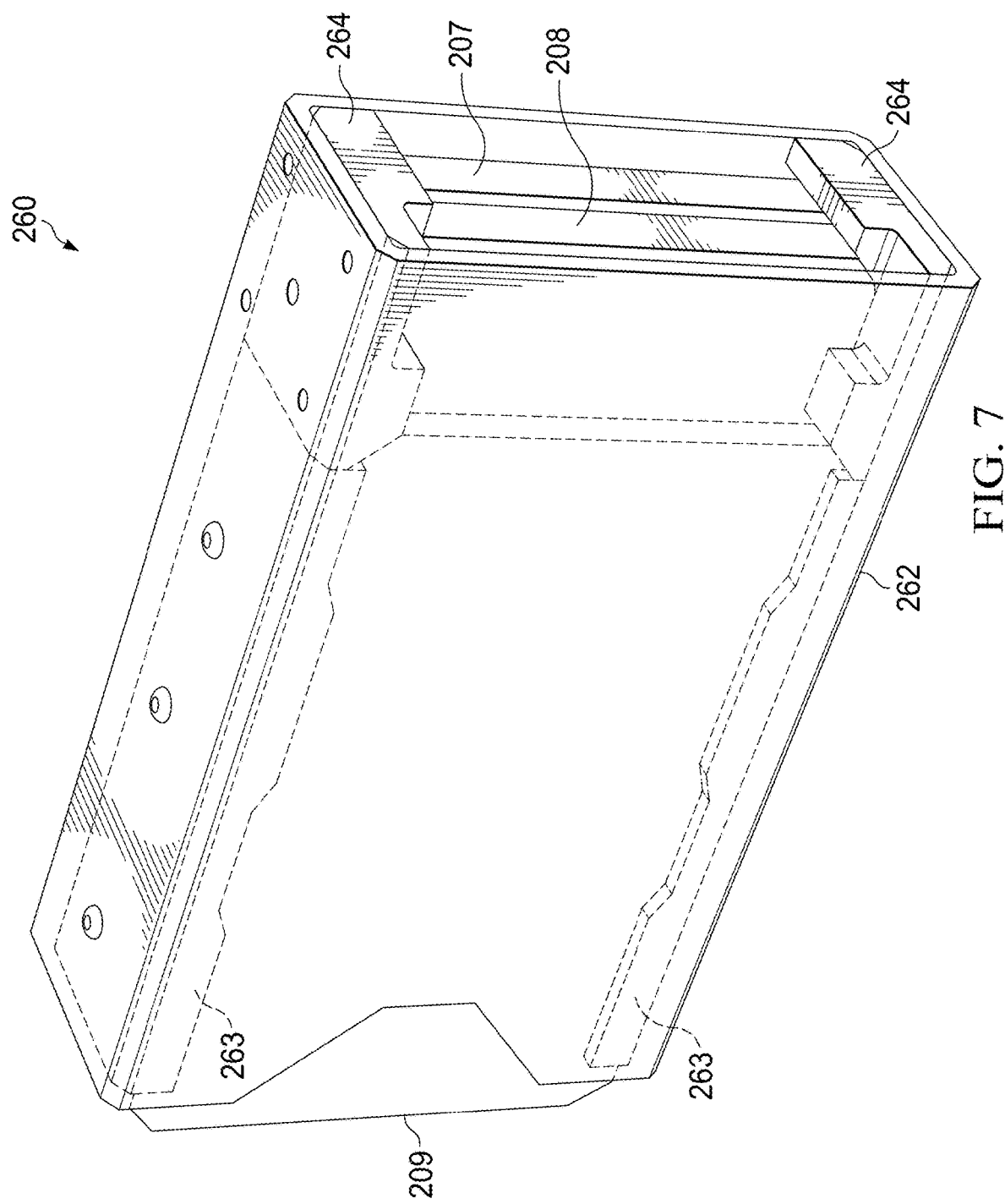
FIG. 7 illustrates a ballast dock in accordance with aspects of the disclosure.

FIG. 7 illustrates a ballast dock 260. In contrast to ballast docks 100, 200, ballast dock 260 includes a housing 262 that is formed as a solitary, tube-like piece. Ballast dock 260 includes a pair of ballast trays 263 and a pair of stop plates 264. The pair of ballast trays 263 are similar to the pair of ballast trays 103, 203 and the pair of stop plates 264 are similar to the pair of stop plates 136. Housing 262 is illustrated as transparent in FIG. 7 so that the pair of ballast trays 263 and stop plates 264 can be seen more clearly. Movable ballasts 207-209 are shown installed in housing 262. Ballast dock 260 is generally similar to ballast docks 100, 200 and will not be discussed in more detail.

Figure 8:
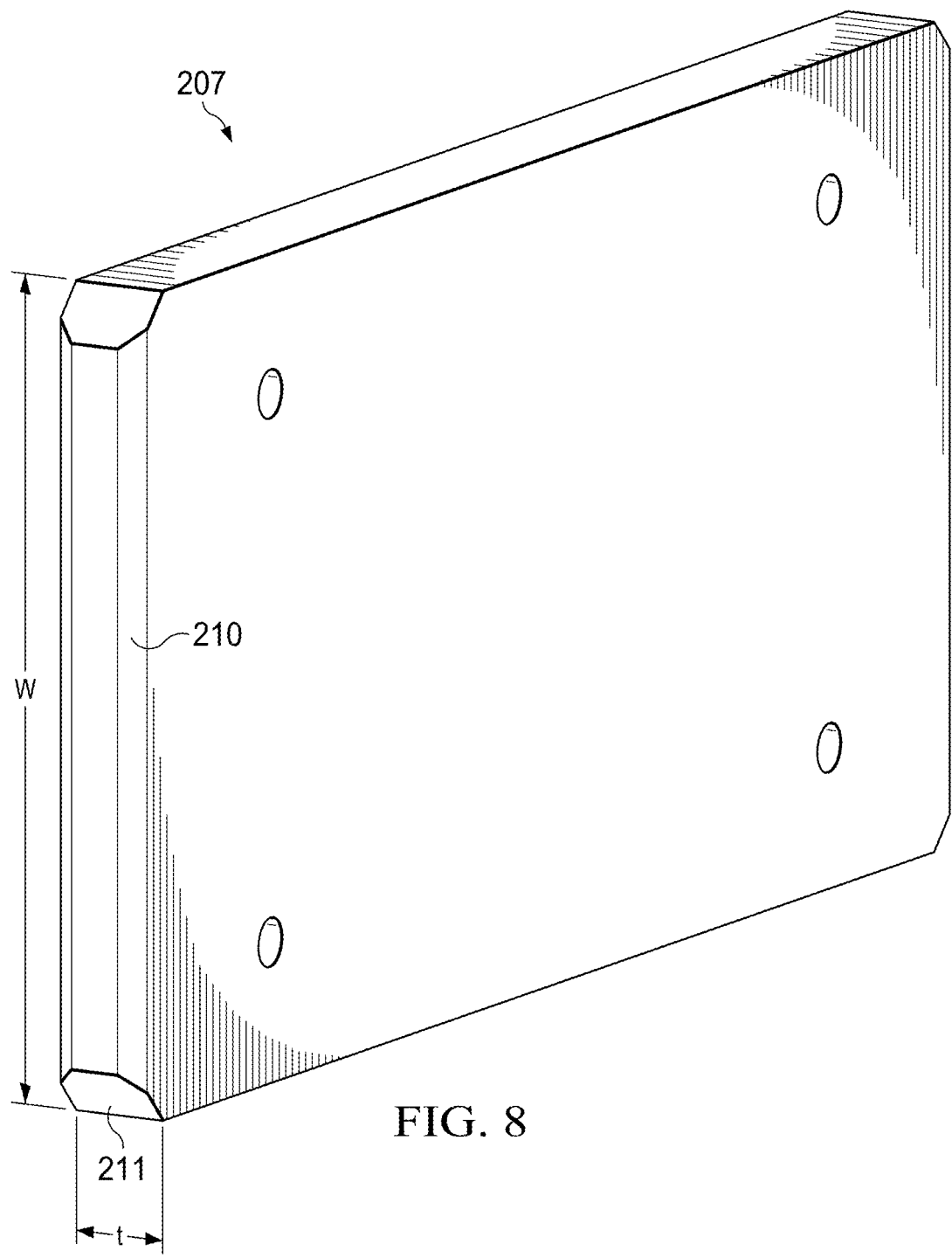
FIG. 8 illustrates a ballast in accordance with aspects of the disclosure.

FIG. 8 illustrates movable ballast 207 in accordance with aspects of the disclosure. Movable ballast 207 is illustrated by way of example with the understanding that the discussion of movable ballast 207 applies to movable ballasts 208 and 209. Movable ballast 207 can be made of various materials. In various aspects, movable ballast 207 is made from dense materials (e.g., tungsten, steel, and the like) to provide more weight per volume so that a size of movable ballast system 50 can be minimized. Each of bays 104-106 and 204-206 are complementarily shaped to receive movable ballasts 207-209. In some aspects, movable ballast 207 only fits in bays 104, 204, movable ballast 208 only fits in bays 105, 205, and movable ballast 209 only fits in bays 106, 206. For example, each movable ballast of movable ballasts 207-209 may have a unique thickness t and width w that is complemented by its respective bay 104-106, 204-206 to prevent a user from placing a ballast in the incorrect bay. Each channel 122-126 of ballast tray 103 (see FIG. 4) includes complementary depth d and thickness t to receive movable ballasts 207-209. Dimensioning each movable ballast 207-209 with unique dimensions allows a user to visually recognize which movable ballasts—and thus which weights—are inserted into ballast dock 100. In other aspects, each bay 104-106, 204-206 and movable ballasts 207-209 may include the same dimensions, allowing any of movable ballasts 207-209 to be placed into any of bays 104-106, 204-206.

In an exemplary aspect, fore ballast dock 26 comprises ballast dock 100 and aft ballast dock 28 comprises ballast dock 200. Those having skill in the art will recognize that either of fore/aft ballast docks 26, 28 could be any of ballast docks 100, 200, 260. To alter the CG of rotorcraft 10, a user (e.g., a pilot, ground crew, etc.) can move one or more of movable ballasts 207-209 between fore ballast dock 26 and aft ballast dock 28. For example, in a heavy cabin aspect (e.g., rotorcraft 10 is loaded up with passengers or cargo), the CG of rotorcraft 10 is located relatively forward as a result of the extra weight of the passengers and/or cargo. If the CG shifts too far forward, the flight characteristics of rotorcraft 10 will be altered. For example, a forward CG requires excessive rear cyclic to maintain a hover. To combat a forward CG, the user can insert one or more of movable ballasts 207-209 in aft ballast dock 28 as needed to shift the CG toward the rear of rotorcraft 10. Due to the long lever arm afforded by tail boom 24, adding one or more movable ballasts 207-209 to aft ballast dock 28 can have a large effect upon the location of the CG of rotorcraft 10.

In a light cabin aspect (e.g., rotorcraft 10 is not loaded up with passengers and/or cargo), the CG of rotorcraft 10 is located relatively rearward as a result of the lack of weight from passengers and/or cargo. If the CG shifts too far rearward, the flight characteristics of rotorcraft 10 will be altered. For example, a rearward CG requires excessive forward cyclic to maintain a hover. To combat a rearward CG, the user can insert one or more of movable ballasts 207-209 into fore ballast dock 26 as needed to shift the CG toward the front of rotorcraft 10. Due to the long lever arm afforded by tail boom 24, removing one or more movable ballasts 207-209 from aft ballast dock 28 can have a large effect upon the location of the CG of rotorcraft 10.

In either a heavy or light cabin aspect, movable ballast system 50 allows a user to quickly and easily move one or more of movable ballasts 207-209 between fore/aft ballast docks 26, 28 to adjust the CG of rotorcraft 10. In contrast to movable ballast system 50, conventional rotorcraft have no ballast system or have a fixed ballast system. A fixed ballast system adds ballast to the aircraft by bolting the ballast to the airframe of the aircraft. For example, ballast may be bolted into a tail section of the aircraft. In a heavy cabin scenario, the pilot has no ability to add temporary ballast to the tail section and instead must try to shift cargo etc. to the rear of the cabin and hope that the rearrangement of the cargo is sufficient to address the rearward CG. In a light cabin scenario, the pilot must add temporary ballast (e.g., water jugs or sandbags) to the cabin to counteract the rearward CG problem. Removal of ballast bolted to the tail section is impractical as it requires a certified mechanic to disassemble components of the aircraft to remove the bolted-in ballast.

Compared to conventional ballast setups, movable ballast system 50 is more versatile as it gives the user the ability to shift the CG forward or rearward as needed without the need of such items as sandbags and water jugs for temporary ballast. Relying on temporary ballast can be problematic as a user may not always have convenient access to temporary ballast when needed. For example, if an aircraft flies to a remote destination while loaded up with passengers and/or cargo, the aircraft may be in a heavy cabin scenario with a forward CG where rear ballast is needed. Once the passengers and/or cargo are no longer on board, the aircraft may transition from a heavy cabin to a light cabin with rearward CG. Movable ballast system 50 allows the user to easily place one or more movable ballasts 207-209 into aft ballast dock 28 for the first leg of the trip to counteract the forward CG and to easily place one or more movable ballasts 207-209 into fore ballast dock 26 to counteract the rearward CG for the second leg of the flight. Without movable ballast system 50, it may be difficult for a user to add the needed temporary ballast once the aircraft arrives at the remote location as materials needed for the temporary ballast may not be readily available.

In an opposite scenario, where the aircraft flies to a remote location to pick up passengers and/or cargo, the aircraft may start the journey in a light cabin scenario with a rearward CG. Without movable ballast system 50, the user must place temporary ballast in the cabin to counteract the rearward CG. Once the aircraft arrives at the remote location to pick up the passengers and/or cargo, the temporary ballast is no longer necessary as the aircraft will transition to a heavy cabin scenario. The user must then either leave the temporary ballast behind or take up some of the space and carrying capacity of the aircraft with the temporary ballast, neither of which is desirable.

Figure 9:
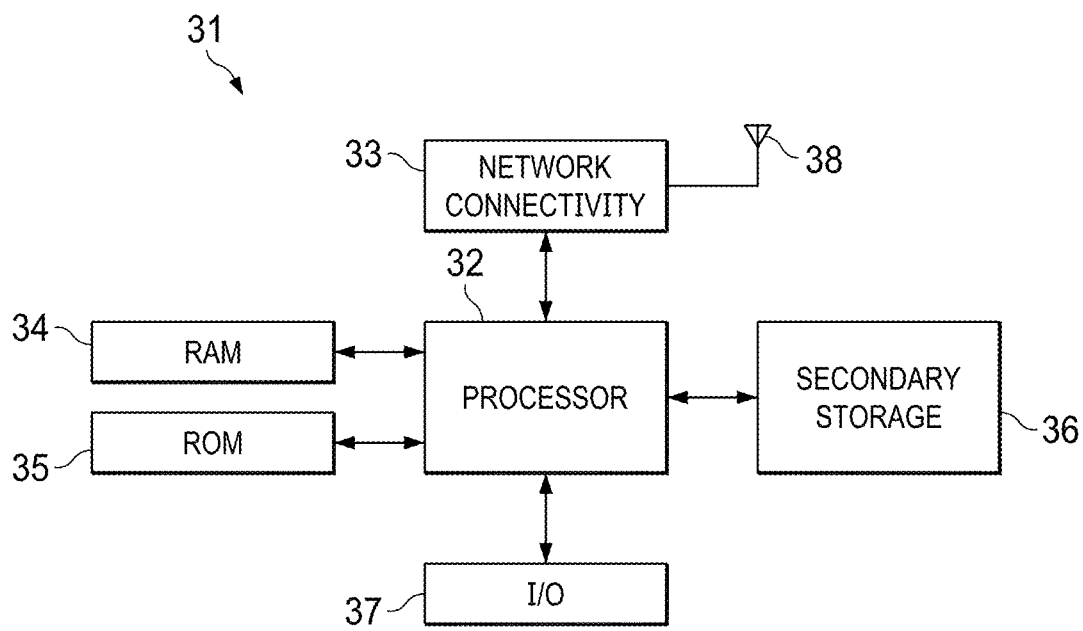
FIG. 9 is a schematic diagram of a general-purpose processor (e.g. electronic controller or computer) system suitable for implementing aspects of the disclosure.

In some aspects, flight control computer 30 calculates a CG of rotorcraft 10 to aid a user in determining placement of movable ballasts 207-209 into fore/aft ballast docks 26, 28. FIG. 9 is a schematic diagram of a general-purpose processor (e.g. electronic controller or computer) system 31 suitable for implementing the aspects of this disclosure is shown. System 31 includes processing component and/or processor 32 suitable for implementing one or more aspects disclosed herein. In some aspects, flight control computer 30 and/or other electronic systems of rotorcraft 10 may include one or more systems 31. In addition to processor 32 (which may be referred to as a central processor unit or CPU), system 31 might include network connectivity devices 33, random access memory (RAM) 34, read only memory (ROM) 35, secondary storage 36, and input/output (I/O) devices 37. In some cases, some of these components may not be present or may be combined in various combinations with one another or with other components not shown. These components might be located in a single physical entity or in more than one physical entity. Any actions described herein as being taken by the processor 32 might be taken by the processor 32 alone or by the processor 32 in conjunction with one or more components shown or not shown in the system 31. It will be appreciated that the data described herein can be stored in memory and/or in one or more databases.

Processor 32 executes instructions, codes, computer programs, or scripts that it might access from the network connectivity devices 33, RAM 34, ROM 35, or secondary storage 36 (which might include various disk-based systems such as hard disk, floppy disk, optical disk, or other drive). While only one processor 32 is shown, multiple processors 32 may be present. Thus, while instructions may be discussed as being executed by processor 32, the instructions may be executed simultaneously, serially, or otherwise by one or multiple processors 32. The processor 32 may be implemented as one or more CPU chips and/or application specific integrated chips (ASICs).

The network connectivity devices 33 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, worldwide interoperability for microwave access (WiMAX) devices, and/or other well-known devices for connecting to networks. These network connectivity devices 33 may enable the processor 32 to communicate with the Internet or one or more telecommunications networks or other networks from which the processor 32 might receive information or to which the processor 32 might output information.

The network connectivity devices 33 might also include one or more transceiver components 38 capable of transmitting and/or receiving data wirelessly in the form of electromagnetic waves, such as radio frequency signals or microwave frequency signals. Alternatively, the data may propagate in or on the surface of electrical conductors, in coaxial cables, in waveguides, in optical media such as optical fiber, or in other media. The transceiver component 38 might include separate receiving and transmitting units or a single transceiver. Information transmitted or received by the transceiver component 38 may include data that has been processed by the processor 32 or instructions that are to be executed by processor 32. Such information may be received from and outputted to a network in the form, for example, of a computer data baseband signal or signal embodied in a carrier wave. The data may be ordered according to different sequences as may be desirable for either processing or generating the data or transmitting or receiving the data. The baseband signal, the signal embedded in the carrier wave, or other types of signals currently used or hereafter developed may be referred to as the transmission medium and may be generated according to several methods well known to one skilled in the art.

RAM 34 might be used to store volatile data and perhaps to store instructions that are executed by the processor 32. The ROM 35 is a non-volatile memory device that typically has a smaller memory capacity than the memory capacity of the secondary storage 36. ROM 35 might be used to store instructions and perhaps data that are read during execution of the instructions. Access to both RAM 34 and ROM 35 is typically faster than to secondary storage 36. The secondary storage 36 is typically comprised of one or more disk drives or tape drives and might be used for non-volatile storage of data or as an over-flow data storage device if RAM 34 is not large enough to hold all working data. Secondary storage 36 may be used to store programs or instructions that are loaded into RAM 34 when such programs are selected for execution or information is needed.

The I/O devices 37 may include liquid crystal displays (LCDs), touchscreen displays, keyboards, keypads, switches, dials, mice, track balls, voice recognizers, card readers, paper tape readers, printers, video monitors, transducers, sensors, or other well-known input or output devices such as "glass cockpits." Also, transceiver component 38 might be considered to be a component of the I/O devices 360 instead of or in addition to being a component of the network connectivity devices 33. Some or all of the I/O devices 37 may be substantially similar to various components disclosed herein and/or may be components of a flight control system and/or other electronic systems of rotorcraft 10.

In some aspects, flight control computer 30 is preprogrammed with certain parameters regarding the CG of rotorcraft 10 such that flight control computer can calculate the CG of rotorcraft 10. For example, flight control computer 30 knows an approximate location of the CG of rotorcraft 10 when rotorcraft 10 is empty (e.g., no pilot, no cargo, no passengers, etc.). A user can input additional load parameters into flight control computer 30 using I/O devices 37. For example, load parameters can include one or more of fuel parameters, passenger parameters, cargo parameters, and ballast parameters. Fuel parameters can include the location of the fuel within the aircraft and the fuel's weight. Passenger parameters can include the location of the passenger within the aircraft and the passenger's weight. Cargo parameters can include the location of the cargo within the aircraft and the cargo's weight. Ballast parameters can include the location of the ballast and the ballast's weight.

Figure 10:
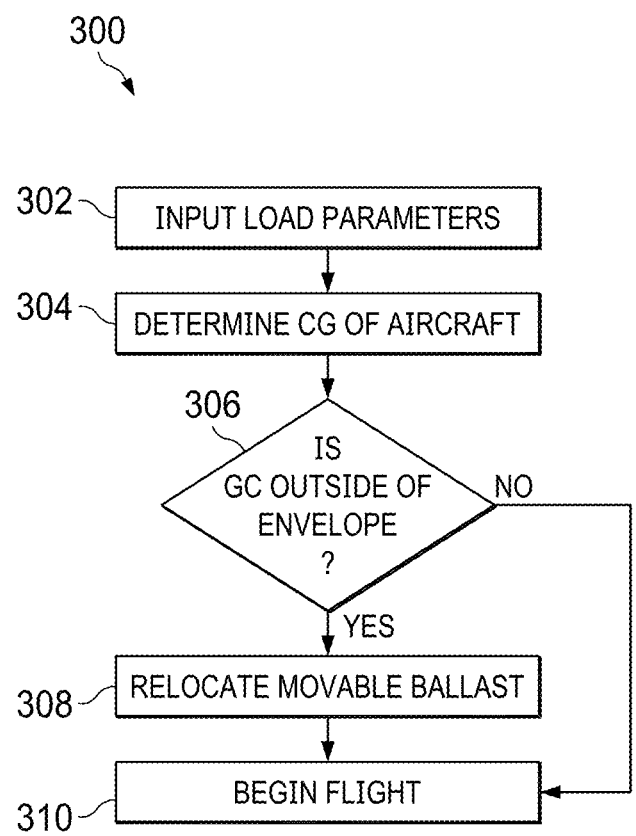
FIG. 10 is an illustrative method for moving a center of gravity of an aircraft.

FIG. 10 is an illustrative method 300 for setting a center of gravity of an aircraft. FIG. 10 is discussed relative to FIGS. 1-9. Method 300 begins at step 302. In step 302, load parameters are input into flight control computer 30. For example, a user (e.g., ground crew, pilot, co-pilot, etc.) inputs one or more of fuel parameters, passenger parameters, cargo parameters, and ballast parameters into flight control computer 30. In some aspects, each parameter that is entered describes a weight and a location of the weight within rotorcraft 10. The location of the weight can be described using coordinates (e.g., x, y, z) that are used by flight control computer 30 to calculate the CG of rotorcraft 10. The various parameters may be input using I/O devices 37. After load parameters are entered into flight control computer 30, method 300 proceeds to step 304.

In step 304, flight control computer 30 calculates the CG of rotorcraft 10, factoring in the load parameters entered in step 302. In step 306, the calculated CG is compared to the CG envelope of rotorcraft 10. Responsive to a determination that the calculated CG is outside of the CG envelope of rotorcraft 10, method 300 proceeds to step 308. Responsive to a determination that the calculated CG is within the CG envelope, method 300 proceeds to step 310.

In step 308, one or more movable ballasts 207-209 are relocated to fore/aft ballast docks 26, 28 to move the CG of rotorcraft 10. For example, if the calculated CG indicates a rearward CG, one or more movable ballasts 207-209 are moved to fore ballast dock 26. The farther rearward the CG is, the more weight from movable ballasts 207-209 will need to be moved. If the calculated CG indicates a forward CG, one or more movable ballasts 207-209 are moved to aft ballast dock 28. The farther forward the CG is, the more weight that needs to be moved via movable ballasts 207-209.

If, in step 306, a determination is made that the calculated CG is within the CG envelope, movable ballasts 207-209 do not need to be moved. However, in some aspects, the calculated CG may be within the CG envelope, but may be near a periphery of the CG envelope. In such a situation, despite the calculated CG being within the CG envelope, method 300 may optionally proceed to step 308 to move one or more of movable ballasts 207-209 to shift the CG of rotorcraft 10 to a more favorable position within the CG envelope that is not as close to the periphery of the CG envelope. This may be beneficial where, for example, the CG of rotorcraft 10 may change during flight as fuel burns off. Moving the CG of rotorcraft 10 to be more favorably placed within the CG envelope reduces a likelihood that the CG will transition out of the CG envelope during a flight.

After any changes to the positioning of movable ballasts have been made, method 300 proceeds to step 310 and rotorcraft 10 may begin its flight. In some aspects, method 300 is iterated. For example, method 300 may return to step 304 after completing step 308 to confirm that the relocation of one or more of movable ballasts 207-209 has improved the location of the CG a sufficient amount.

The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed embodiment, the terms "substantially," "approximately," "generally," and "about" may be substituted with "within [a percentage] of" what is specified, as understood by a person of ordinary skill in the art. For example, within 1%, 2%, 3%, 5%, and 10% of what is specified herein.

The foregoing outlines features of several embodiments so that those skilled in the art may better understand the aspects of the disclosure. Those skilled in the art should appreciate that they may readily use the disclosure as a basis for designing or modifying other processes and structures for carrying out the same purposes and/or achieving the same advantages of the embodiments introduced herein. Those skilled in the art should also realize that such equivalent constructions do not depart from the spirit and scope of the disclosure, and that they may make various changes, substitutions and alterations herein without departing from the spirit and scope of the disclosure. The scope of the invention should be determined only by the language of the claims that follow. The term "comprising" within the claims is intended to mean "including at least" such that the recited listing of elements in a claim are an open group. The terms "a," "an" and other singular terms are intended to include the plural forms thereof unless specifically excluded.

What is claimed is:

1. A ballast dock comprising:
   a housing;
   a first ballast tray secured within the housing and having formed therein a plurality of channels;
   a first stop plate secured within the housing; and
   a plurality of movable ballasts, each movable ballast of the plurality of movable ballasts configured to fit within at least one channel of the plurality of channels.

2. The ballast dock of claim 1, comprising:
   a second ballast tray secured within the housing and comprising a plurality of channels;
   a second stop plate secured within the housing; and
   wherein opposing channels of the first and second ballast trays form bays configured to receive a movable ballast of the plurality of movable ballasts.

3. The ballast dock of claim 1, wherein the first ballast tray comprises a material selected from the group consisting of rubbers, plastics, and polymers.

4. The ballast dock of claim 1, wherein the first ballast tray is coated with a material selected from the group consisting of rubbers, plastics, and polymers.

5. The ballast dock of claim 1, wherein each channel of the plurality of channels is dimensioned so that only one movable ballast of the plurality of movable ballasts fits within a particular channel of the plurality of channels.

6. The ballast dock of claim 1, comprising a mounting plate configured to secure the ballast dock to an aircraft.

7. The ballast dock of claim 1, comprising a door secured to the housing and configured to secure the plurality of movable ballasts within the housing.

8. The ballast dock of claim 7, wherein the door comprises a pad disposed on an inside of the door and configured to be biased against at least one of the plurality of movable ballasts when at least one of the plurality of movable ballasts are positioned within the housing.

9. The ballast dock of claim 1, wherein the plurality of movable ballasts comprises a first, a second, and a third movable ballast.

10. The ballast dock of claim 9, wherein the first and second movable ballasts is of a first weight and the third ballast is of a second weight, the first and second weights being different.

11. The ballast dock of claim 1, wherein each movable ballast of the plurality of movable ballasts has a different weight.

12. A movable ballast system for an aircraft, the movable ballast system comprising:
a first ballast dock secured to the aircraft and comprising:
a first housing; and
a first ballast tray and a first stop plate secured within the first housing, the first ballast tray having formed therein a plurality of channels;
a second ballast dock secured to the aircraft and positioned aft of a CG of the aircraft, the second ballast dock comprising:
a second housing; and
a second ballast tray and a second stop plate secured within the second housing, the second ballast tray having formed therein a plurality of channels; and
a plurality of movable ballasts, each movable ballast of the plurality of movable ballasts being configured to fit within at least one channel of each of the plurality of channels of the first and second ballast trays.

13. The movable ballast system of claim 12, comprising:
wherein the first ballast dock comprises a third ballast tray secured within the first housing and having formed therein a plurality of channels;
wherein the second ballast dock comprises a fourth ballast tray secured within the second housing and having formed therein a plurality of channels; and
wherein opposing channels of the first and third ballast trays and opposing channels of the second and fourth ballast trays form bays configured to receive a movable ballast of the plurality of movable ballasts.

14. The movable ballast system of claim 12, wherein the first and second ballast trays comprise a material selected from the group consisting of rubbers, plastics, and polymers.

15. The movable ballast system of claim 12, wherein the first and second ballast trays are coated with a material selected from the group consisting of rubbers, plastics, and polymers.

16. The movable ballast system of claim 12, wherein each channel of the plurality of channels of the first and second ballast trays is dimensioned so that only one movable ballast of the plurality of movable ballasts fits within a particular channel of the plurality of channels.

17. The movable ballast system of claim 12, wherein the first ballast dock comprises a mounting plate configured to secure the first ballast dock to the aircraft.

18. The movable ballast system of claim 12, comprising:
a first door secured to the first housing and configured to secure at least one of the plurality of movable ballasts within the first housing; and
a second door secured to the second housing and configured to secure at least one of the plurality of movable ballasts within the second housing.

19. The movable ballast system of claim 18, wherein the first door comprises a pad disposed on an inside of the first door and configured to be biased against a movable ballast of the plurality of movable ballasts when the movable ballast is positioned within the first housing.

20. The movable ballast system of claim 12, wherein each movable ballast of the plurality of movable ballasts has a unique weight.

* * * * *